No. 669,874. Patented Mar. 12, 1901.
C. T. BIRCHARD & G. R. CAMPBELL.
CUTTING-OFF TOOL.
(Application filed June 6, 1900.)
(No Model.)
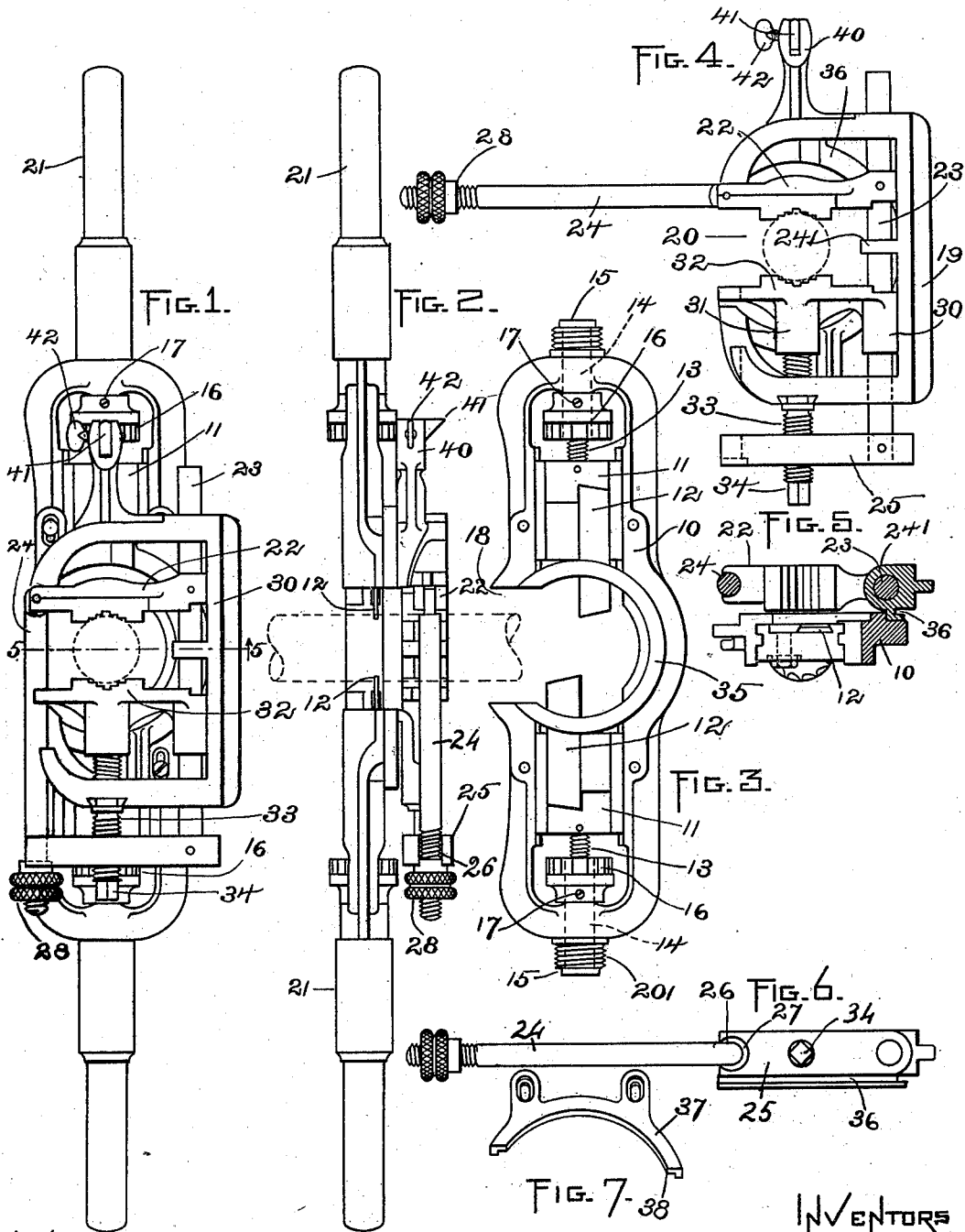
Witnesses:
Inventors
C. T. Birchard
G. R. Campbell

UNITED STATES PATENT OFFICE.

CHARLES T. BIRCHARD, OF MELROSE, MASSACHUSETTS, AND GEORGE R. CAMPBELL, OF ELLSWORTH, MAINE; SAID CAMPBELL ASSIGNOR TO SAID BIRCHARD.

CUTTING-OFF TOOL.

SPECIFICATION forming part of Letters Patent No. 669,874, dated March 12, 1901.

Application filed June 6, 1900. Serial No. 19,262. (No model.)

*To all whom it may concern:*

Be it known that we, CHARLES T. BIRCHARD, of Melrose, in the county of Middlesex and State of Massachusetts, and GEORGE R. CAMPBELL, of Ellsworth, in the county of Hancock and State of Maine, have invented certain new and useful Improvements in Cutting-Off Tools, of which the following is a specification.

This invention has relation to cut-off tools of the type illustrated and described in the patent to Bartholomew, No. 546,573, dated September 17, 1895. In said machine provision is made for clamping the work to be cut between two jaws in a chuck and then rotating a stock having cutters about the work, said cutters being mounted in carriers which are advanced automatically during each rotation of the stock around the work. The carriers are adapted to slide in an oblong frame or casting the sides and ends of which are continuous, and hence it is essential in order to place the tool upon a shaft or bar to insert the end of the said bar through the opening in the oblong frame and to slide said bar endwise therethrough, so as to affix the jaws at a point adjacent to which it is desired to sever the work or bar. It is frequently desirable, however, to cut or sever shafting and bars which are already journaled or otherwise secured in place, and it has heretofore been necessary to detach said shafting or bars and strip at least one end thereof of pulleys or other attachments in order to insert them into the tool.

The main object of the present invention is to provide a tool or machine of the class referred to with provisions whereby a bar or shaft may be introduced laterally into the machine to be severed at any desired point and without sliding it lengthwise thereinto.

The invention therefore consists of a cutting-off tool possessing certain features of improvement, which are illustrated upon the drawings, described in detail in the following specification, and pointed out with particularity in the appended claims, whereby provision is made for the insertion of a bar or shaft into the space between the jaws.

Referring to the said drawings, Figure 1 represents in front elevation a tool or machine equipped with our invention. Fig. 2 represents a side elevation of the same. Fig. 3 represents a view of the frame detached. Fig. 4 represents a view of the clamping mechanism detached with a portion thereof in position to permit the insertion of the stock between the clamps. Fig. 5 represents a section on the line 5 5 of Fig. 1. Fig. 6 represents in end view the clamping mechanism with the side bar swinging outward. Fig. 7 represents in detail detachable portions of the guide on the frame.

On the said drawings, 10 indicates an oblong frame or casting having side bars and end bars, all cast integrally. Between the side bars provision is made for guiding the cutter-carriers 11 11, upon which are rigidly secured the cutters 12 12, said cutters projecting toward each other, as shown in Fig. 3. The carriers 11 11 are adapted to be moved positively toward and from each other by screw-threaded rods 13 13, extending into the internally-threaded sleeves 14, passed rotatively through the end bars of the frame. The ends of said sleeves are flanged or headed, as at 15, whereby they are held from moving inwardly, and on the inwardly-projecting portions of said sleeves are rigidly secured the ratchets 16 16. Any suitable means may be employed for securing said ratchets in place, although for general purposes we prefer to employ the screws 17. When said ratchets are rotated, they rotate the threaded sleeves, and the latter serve to advance or retract the cutter-carriers 11. One of the side bars of the frame is cut away, so as to leave a large lateral opening 18, through which the bar or shaft may be passed into operative relation with the cutters. On the end bars there are formed externally-threaded annular flanges 201, on which are screwed handles 21 21 for rotating the frame.

The frame and the cutter-carriers, with the mechanism for advancing them, constitute the stock, the chuck consisting of a substantially quadrilateral frame 19, which carries the clamps or jaws. One of the side bars of said frame is cut away, as at 20, to leave an opening similar to that at 18, through which the bar or shaft may be moved laterally between the clamps or jaws.

The jaws or clamps are indicated at 22 32. The clamp 22 consists of a transversely-arranged bar secured at one end to a sliding rod 23, which extends through a guide 241 on the side bar of the frame 19 and also through the end bars of said frame. One end of the rod 23 is rigidly secured to a cross-head 25. The jaw 22 has pivoted to its outer end a rod 24, which is movable into the position shown in Figs. 4 and 6, so as not to obstruct the opening 20, but which may be moved into the position shown in Fig. 1, where it is detachably connected to the cross-head 25. Said cross-head 25 is provided in the end with a slot 26 to receive said rod and with a socket 27 to receive a nut 28, placed on the threaded end of the rod 24. The rod is swung into the slot, and the nut 28 is rotated until it is seated in the socket 27, whereby the said rod is held from outward movement. The jaw 32 and the frame 19 are both slotted to receive the bar 24, whereby said bar serves as a guide for the said jaw 32, as will be described. On its inner end the jaw 32 is formed with a sleeve 30, through which the rod 23 passes, and the said jaw is further provided with an internally-threaded annular boss 31 between its ends. In order to move said jaws toward and from each other, there is provided a screw-bar 33, the ends of which are oppositely threaded. The middle portion of said bar is non-threaded and is journaled in the end bar of the frame 19, and the threaded ends extend into the annular boss 31 and into a threaded aperture in the cross-head 25. The extremity of the screw-bar 33 is squared, as shown at 34, to receive a wrench by means of which it may be rotated to move said jaws toward and from each other.

The chuck is rotatively connected to the stock. To this end the frame 10 is provided with a circular guide 35 to fit inside a grooved ring 36 on the chuck. Segmental guides 37 are clamped to the stock and are provided with flanges 38, which extend into the groove in the ring 36. Both the ring 36 and the circular guide 35 are cut away to leave openings into the interior of the frames of the stock and the chuck, so that when the openings 20 and 18 are brought to register with each other the rod 24 may be disengaged from the cross-head 25 and thrown into the position shown in Fig. 4 for the insertion of a rod or bar laterally between the jaws 22 and in a position to be operated upon by the cutters.

On the chuck is placed a pawl or finger to successively engage the ratchets 16 16 for feeding the cutters. On the end bar of the frame 19, opposite the cross-head 25, there is a bracket 40, in which a pawl or finger 41 is detachably secured by a set-screw 42.

The manner of using the tool or machine is as follows: The stock is turned upon the chuck until the lateral openings 18 and 20 register. The rod 24 is disengaged from the cross-head 25 and swung laterally. Then the tool may be placed upon the bar or shaft to be severed and the rod 24 is again locked in engagement with the cross-head 25. The jaws 22 32 are rigidly clamped on the work by the rotating screw-bar 34. Then the stock is rotated and the cutters are fed gradually toward the center of the work, the rotation of the stock continuing until the work is entirely severed.

Having thus explained the nature of the invention and described a way of constructing and using the same, although without attempting to set forth all of the forms in which it may be made or all of the modes of its use, we declare that what we claim is—

1. A tool of the character described, comprising a chuck having adjustable clamps for clamping the work, and means for operating said clamps simultaneously, and a stock rotatable on said chuck and having cutters thereon, said chuck and stock having provisions for the lateral insertion of the work.

2. A tool of the character described, comprising a chuck having clamps for clamping the work, and means for operating said clamps simultaneously, and a rotatable stock having cutters thereon, said chuck and stock having openings in the side through which the work may be laterally inserted.

3. A tool of the character described, comprising a stock having cutters thereon, a chuck on which the stock is journaled, said stock and chuck having openings in the sides, clamping-jaws on the chuck having provisions for permitting the lateral insertion of the work through said openings and means for operating said jaws simultaneously.

4. A tool of the character described, comprising a stock having cutters thereon, a chuck on which the stock is journaled, said stock and chuck having openings in the sides, and clamping means on the chuck having a bar or rod normally closing the opening in the chuck, but which is laterally movable to unobstruct the said opening.

5. A tool of the character described comprising a stock having a frame with a permanent opening in one of the sides, and a chuck having a frame with a normally-closed opening in one of the sides, substantially as described.

6. A tool of the character described, comprising a stock having a frame with an opening in one of the sides, and a chuck having a frame with an opening in one of the sides, jaws in said chuck, a cross-head, rods connecting the cross-head with one of said jaws, and means for moving said cross-head and the other jaw in opposite directions, one of said rods being detachably connected to the cross-head.

7. A tool of the character described, comprising a chuck; a stock having cutter-carriers slidable in said stock, an internally-threaded headed sleeve rotatably secured in the end of the stock, a ratchet rigidly secured to said sleeve, a screw-bar engaging each carrier and passing into one of the sleeves, an externally-threaded boss on each end of the stock through which a sleeve passes, a handle screwed on each boss; and means on the chuck for engaging and rotating the ratchets.

In testimony whereof we have affixed our signatures in presence of witnesses.

CHARLES T. BIRCHARD.
GEORGE R. CAMPBELL.

Witnesses for Birchard:
M. B. MAY,
P. W. PEZZETTI.

Witnesses for Campbell:
J. A. PETERS, Jr.,
E. T. CUSHMAN.